(12) United States Patent
Valerio (10) Patent No.: US 12,377,421 B2
(45) Date of Patent: Aug. 5, 2025

(54) SYSTEM AND METHOD FOR FOUR DIMENSIONALLY SEPARATING MATERIALS

(71) Applicant: Thomas A. Valerio, Atlanta, GA (US)

(72) Inventor: Thomas A. Valerio, Atlanta, GA (US)

( * ) Notice: Subject to any disclaimer, the term of this patent is extended or adjusted under 35 U.S.C. 154(b) by 127 days.

(21) Appl. No.: 17/417,073

(22) PCT Filed: Dec. 21, 2019

(86) PCT No.: PCT/US2019/068190
§ 371 (c)(1),
(2) Date: Jun. 21, 2021

(87) PCT Pub. No.: WO2020/142294
PCT Pub. Date: Jul. 9, 2020

(65) Prior Publication Data
US 2022/0055038 A1    Feb. 24, 2022

Related U.S. Application Data

(60) Provisional application No. 62/784,360, filed on Dec. 21, 2018.

(51) Int. Cl.
*B03B 5/34*     (2006.01)
*B03B 9/06*     (2006.01)
*B03B 11/00*    (2006.01)

(52) U.S. Cl.
CPC .............. *B03B 5/34* (2013.01); *B03B 9/061* (2013.01); *B03B 2009/068* (2013.01); *B03B 2011/002* (2013.01); *B03B 2011/008* (2013.01)

(58) Field of Classification Search
CPC .... B03B 5/22; B03B 5/32; B03B 5/34; B03B 5/44; B03B 9/061; B03B 2009/068; B03B 2011/008; B01D 21/267
See application file for complete search history.

(56) References Cited

U.S. PATENT DOCUMENTS 2,835,387 A * 5/1958 Fontein ................. B01D 21/34
209/731
2,854,136 A    9/1958 Gillie et al.
(Continued)

FOREIGN PATENT DOCUMENTS

CN          106267927          1/2017
WO    WO-2017100371 A1 *  6/2017 ......... B02C 18/0084
WO          2018102617         6/2018

OTHER PUBLICATIONS

International Search Report, dated Jul. 16, 2020, from corresponding International Application No. PCT/US2019/068190.
(Continued)

*Primary Examiner* — Joseph C Rodriguez
(74) *Attorney, Agent, or Firm* — Nigamnarayan Acharya (57) ABSTRACT

This application discloses a separator for separating and recovering materials from a waste stream. The separator has a cyclone having a top section and a bottom section, an impeller within the cyclone, a media inlet for accepting a flow of media or a pulsating flow of the media operatively connected to the impeller in which media or fluid flows through the impeller into the separator; a first discharge passage for a collecting a light fraction, and a second discharge passage for collecting a heavy fraction.

9 Claims, 5 Drawing Sheets

(56) References Cited

U.S. PATENT DOCUMENTS

| | | | | |
|---|---|---|---|---|
| 2,877,896 | A | * | 3/1959 | Jones ................. B03B 5/38 209/172.5 |
| 2,957,577 | A | * | 10/1960 | Connelly ............ B03B 5/38 209/172.5 |
| 3,034,649 | A | * | 5/1962 | Connelly ............ B03B 5/38 209/172.5 |
| 4,439,200 | A | | 3/1984 | Meyer et al. |
| 2018/0272356 | A1 | | 9/2018 | Valerio |

OTHER PUBLICATIONS

Written Opinion of the International Searching Authority, dated Jul. 16, 2020, from corresponding International Application No. PCT/US2019/068190.

* cited by examiner

SYSTEM AND METHOD FOR FOUR DIMENSIONALLY SEPARATING MATERIALS

CROSS-REFERENCE TO RELATED APPLICATION

This application claims the benefit of U.S. Provisional Patent Application No. 62/784,360, filed Dec. 21, 2018, which is incorporated by reference herein in its entirety.

TECHNICAL FIELD

This application relates to a method and system for sorting materials. More specifically, this application relates to a method and system that employs an impeller or stirrer inside a cyclone to sort and recover materials from waste stream together with one or more feed distributors therein.

BACKGROUND

Recycling of waste materials is highly desirable from many viewpoints, not the least of which are financial and ecological. Properly sorted recyclable materials often can be sold for significant revenue. Many of the more valuable recyclable materials do not biodegrade within a short period of time. Therefore, recycling such materials significantly reduces the strain on local landfills and ultimately the environment.

Typically, waste streams are composed of a variety of types of waste materials. One such waste stream is generated from the recovery and recycling of automobiles or other large machinery and appliances. For example, at the end of its useful life, an automobile is shredded. This shredded material is processed to recover ferrous and non-ferrous metals. The remaining materials, referred to as automobile shredder residue (ASR), which may still include ferrous and non-ferrous metals, including copper wire and other recyclable materials, is typically disposed of in a landfill. Efforts have been made to further recover materials, such as non-ferrous metals including copper from copper wiling and plastics. Similar efforts have been made to recover materials from whitegood shredder residue (WSR), which are the waste materials left over after recovering ferrous metals from shredded machinery or large appliances. Other waste streams that have recoverable materials may include electronic components (also known as "e-waste" or "waste electrical and electronic equipment (WEEE)), building components, retrieved landfill material, or other industrial waste streams. However, in many instances, no cost-effective methods are available to effectively sort waste materials that contain diverse materials. This deficiency has been particularly true for non-ferrous materials, and particularly for non-metallic materials, such as non-ferrous metals, including copper wiring. For example, one approach to recycling wiring has been to station a number of laborers along a sorting line, each of whom manually sorts through shredded waste and manually selects the desired recyclables from the sorting line. This approach is not sustainable in most economics since the labor component is too high.

Accordingly, there is always a need for improved separation techniques and systems. In view of the foregoing, a need exists for cost-effective, efficient methods and systems for recovering materials from a waste stream, such as materials seen in a recycling process, including non-ferrous metals, in a manner that facilitates revenue recovery while also reducing landfill. It is to these needs, among others, that this disclosure is directed.

SUMMARY

This application discloses a separator for separating and recovering materials from a waste stream. The separator has a source of the waste stream, a cyclone having an impeller or paddle, a feed chute, and an inlet for accepting media. The cyclone has a cylindrical top section and a conical bottom section, and the media inlet is through the impeller. The waste stream enters the cyclone, and media or fluid enters the impeller through the media inlet within the impeller. The impeller rotates in a first direction about an axis in the cyclone. The media can have a specific gravity between about 1.1 and 3.0, and the media enters the impeller through the media inlet as a flow of media or a pulsating flow of media. The source of media is in fluid connection to the cyclone through the media inlet generating a downward and outward flow within the cyclone. There is a first discharge passage for a collecting a light fraction, and a second discharge passage for collecting a heavy fraction.

This application also discloses a method for separating and recovering materials from a waste stream. The method has the steps of feeding the materials through an impeller or paddle into a separator having media that has specific gravity (e.g., between about 1.1 and 3). The separator has a centrifugal motion and a vertical motion therein. The flow of the media into the separator generates a relative specific gravity in the separator and a downward and outward motion. The separator has a cyclone that has cylindrical top section and a conical bottom section. The impeller generates a centrifugal motion and the media inlet is through the impeller. The method can include generating an upward flow of the media through another media inlet or bottom inlet and the upward flow of media through a bottom inlet generates the upward flow of media and the vertical motion. The method can also include generating a downward flow of the media. The light materials that float on a top portion of the separator can be collected and moved away from the separator and the heavier materials at through the bottom portion of the separator can be collected and can be moved away through an operatively connected conveyor.

This application discloses a method for separating and recovering materials from a waste stream. The method include the steps of providing a vessel having a centrifugal motion, an outward motion, an upward motion, and a downward motion therein, wherein the vessel has an impeller to generate centrifugal motion and a chute for the waste stream and media or fluid enters the separator through an impeller; feeding the waste stream through the chute to generate the downward motion; and providing media into the vessel having a specific gravity between 1.1 to about 3, wherein the media is pulsed and the flow of the media generates an upward motion, and collecting fractions of the materials from the vessel.

This application discloses a separator for separating and recovering materials from a waste stream. The separator has a cyclone having a top section and a bottom section, an impeller within the cyclone, a media inlet for accepting a flow of media or a pulsating flow of the media operatively connected to the impeller in which media or fluid flows through the impeller into the separator; a first discharge passage for a collecting a light fraction, and a second discharge passage for collecting a heavy fraction.

DETAILED DESCRIPTION

In general, this disclosure includes methods and systems for separating materials in a waste stream. The methods and systems can separate a heterogeneous mixture of particulate solids. The separation and materials processing method and system are disclosed in which materials enter from the top end through one or more feed distributors and which is arranged so that the materials that enter will be given a tangential velocity component as the material enter the housing. Certain embodiments include a four-dimensional sorting system with the use of an outward centrifugal/stirring motion, an up/down (or vertical) motion from the flow of water or other media, outward pulsing motion, and a fluid or media separation, which can be thought of together as provide "a four-dimensional separation." A low-frequency, high-amplitude pulsing of the media can cause a good distribution of the particles and an enhanced separation effect.

One embodiment includes a separator for the separation of a waste stream, the separator having a cyclone, a stirrer (e.g., an impeller or paddle), one or more feed distributors, an media inlet for accepting the waste stream, a dewatering device; and a screw conveyor. The dewatering device can be a dewatering screen, dewatering conveyor, a screw conveyor or bucket elevator. The cyclone has a conical and cylindrical housing (top) having an interior surface, an inlet and an outlet.

Figure 1:
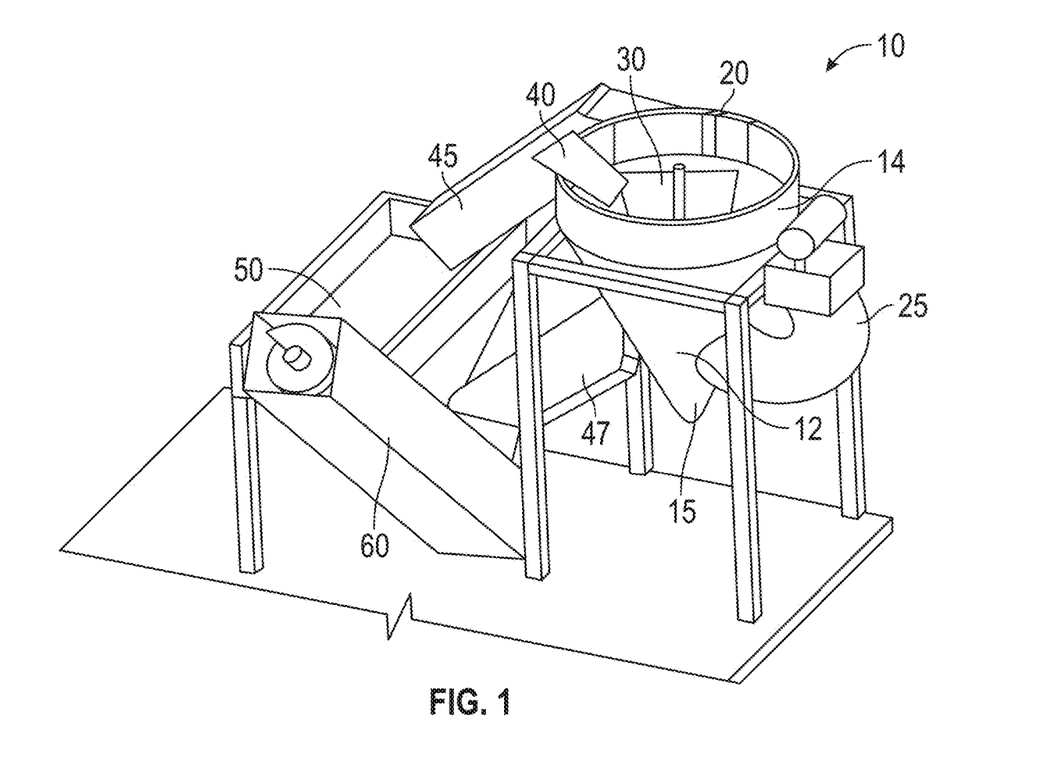
FIG. 1 is a three-dimensional separator, which is disclosed in U.S. Pat. No. 10,486,164.

FIG. 1 shows a prior art apparatus employing a three-dimensional separation process and system. The separator 10 has a cyclone 20, an impeller 30, and a waste stream inlet or chute 40 for accepting the waste stream, a dewatering device 50; and a screw conveyor 60. As can be seen, material or the waste stream can be fed through a feed chute 40 into the three-dimensional separator 10 on the top section of the cyclone 20. The cyclone 20 generally has a cylindrical top section 14 and a conical bottom section 12—however, the cyclone 20 need not have a conical bottom portion. The impeller 30 agitates in centrifugal motion or stirs the media, which flows into the cyclone. A constant flow of media, or a pulsating flow of water or media, is provided through a media circuit with, e.g., an inlet pipe. Chamber 25 connected to the bottom portion of the cone 12, which creates a vertical motion in the cyclone 20. A first discharge for, e.g., the "lights" discharge through the passage 45, a second discharge for, e.g., the fine discharge through "hutch" discharge 47, and a third discharge for e.g., the "heavies" discharge through the outlet 15.

Figure 2:
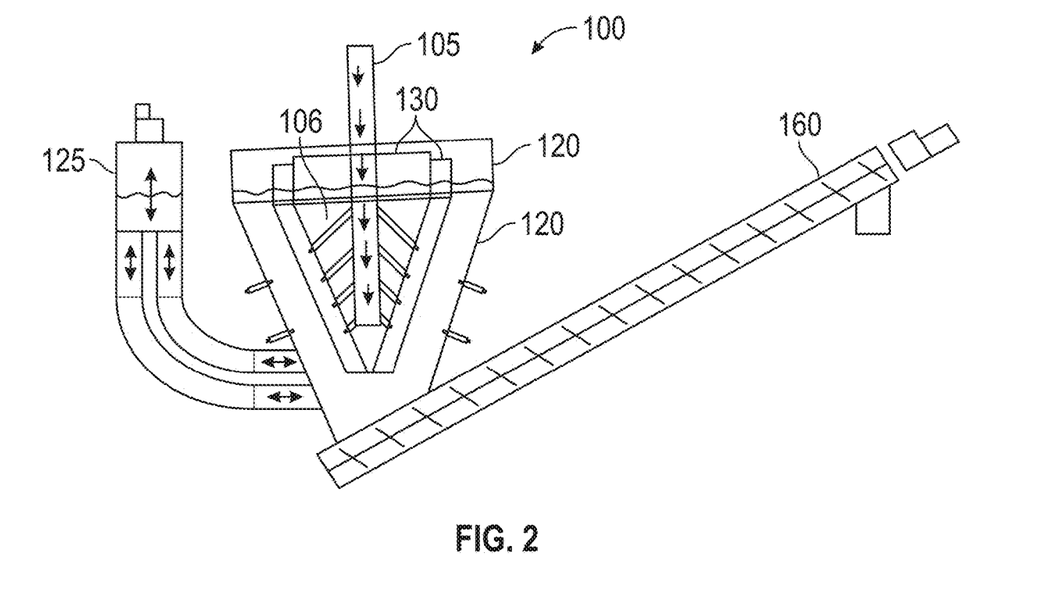
FIG. 2 shows one embodiment of the four-dimensional separator, particularly of the cyclone, the impeller and the media inlet into the impeller.

FIG. 2 shows the addition of an inlet feed distributor in the cyclone 120, which pulses and cycles material/media outward towards the edges of the housing. The four-dimensional separator 100 has a cyclone 120, an impeller 130, and an inlet port/chute (not shown) for accepting the waste stream, and/or a screw conveyor 160. The process and system may include a dewatering device and "lights" discharge chute as depicted in FIG. 2. The teed distributor or the media inlet 105 has a media inlet 105 with veins 106 that spreads into the cyclone 120 or impeller 130, which rotates the media or material. A constant or periodic or other flow of media or pulsating flow of water or media, is provided through a media circuit with, e.g., an inlet port. Chamber 125 connected to the bottom portion of the cone, which creates an oscillating and/or pulsing motion in the cyclone 120. Additional inlets may be along the edge of the housing to further separate the material therein. In this arrangement, the material or fluid can be fed through multiple inlet veins 106 going through the rotary joint, which feeds cyclone. By adding material or fluid through the media inlet 105 from the top, the material is more uniform and homogeneous in the cyclone and prevents "dead" sports in larger cyclone systems.

Figure 3:
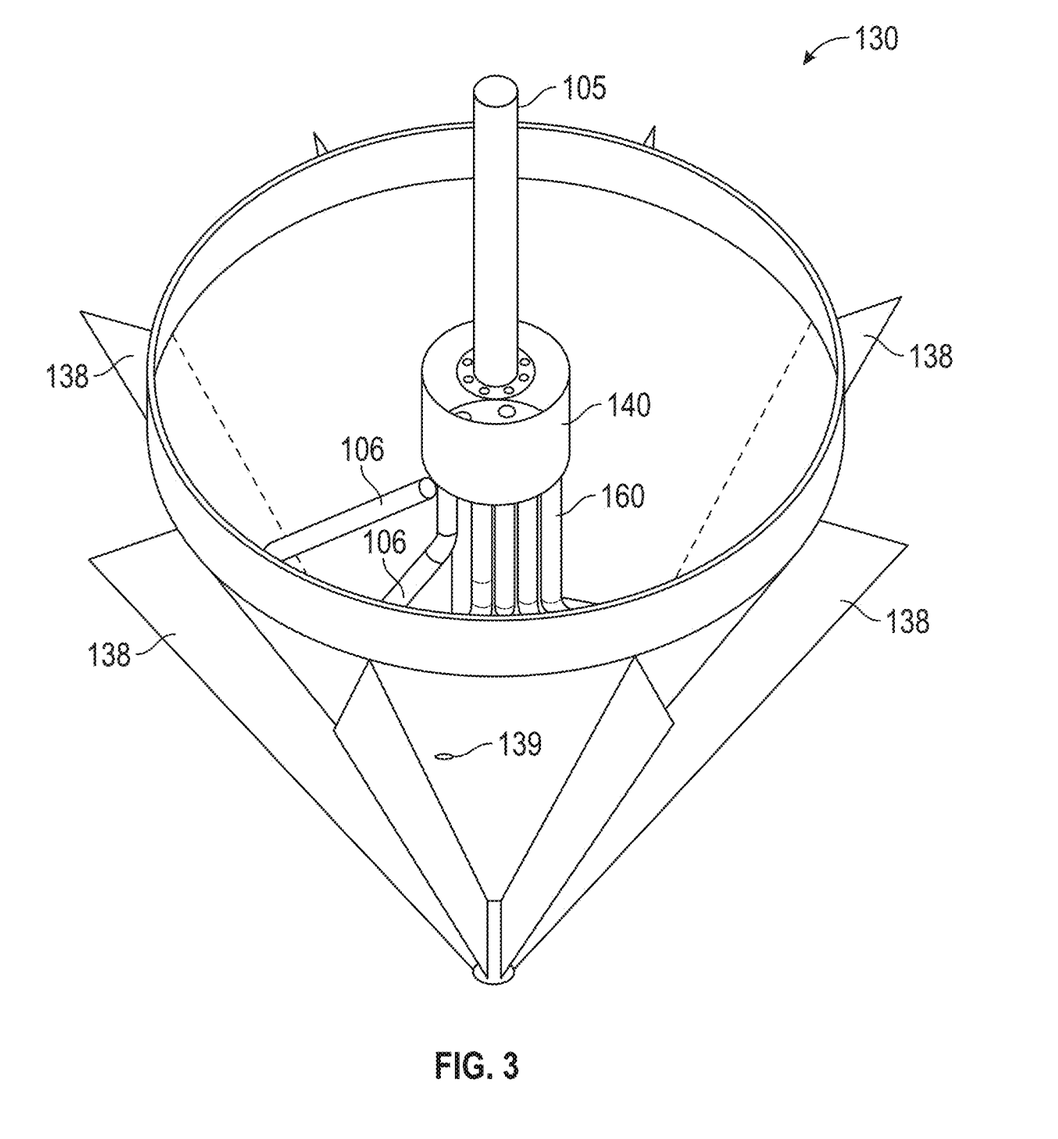
FIG. 3 shows a perspective view of the impeller in a specific embodiment.

FIG. 3 shows and an exemplary impeller 130, which can rotate and the material is directed downward into the cyclone 120 in the same direction. The cyclone 120 has a cylindrical section and a bottom section (e.g., conical). As can be seen, the material enters feed distributor/veins 106 into the cyclone 120 through the impeller 130. As the material enter, it can be spread through a distribution network of veins 106. Impeller 130 can have fins 138 and outlet ports 139. The fins 138 allows the material in the cyclone 120 to circulate and the outlet ports 139 allow the material from the veins 106 to be distributed within the cyclone 120. In one embodiment, the feed distributor or veins 106 is designed like a pulp distributor, which can help ensure an even distribution of flow and an equal split of solids. A rotary union or rotary coupling 140 allows for rotation of the impeller 130 to rotate while the inlet 105 remains stationary. It is thus a device that provides a seal between a stationary supply passage (such as pipe or tubing) and a rotating part (such as a drum, cylinder, or spindle) to permit the flow of a fluid into and/or out of the rotating part. Other rotary joints, such as through the use the bearings, may be used.

Figure 4:
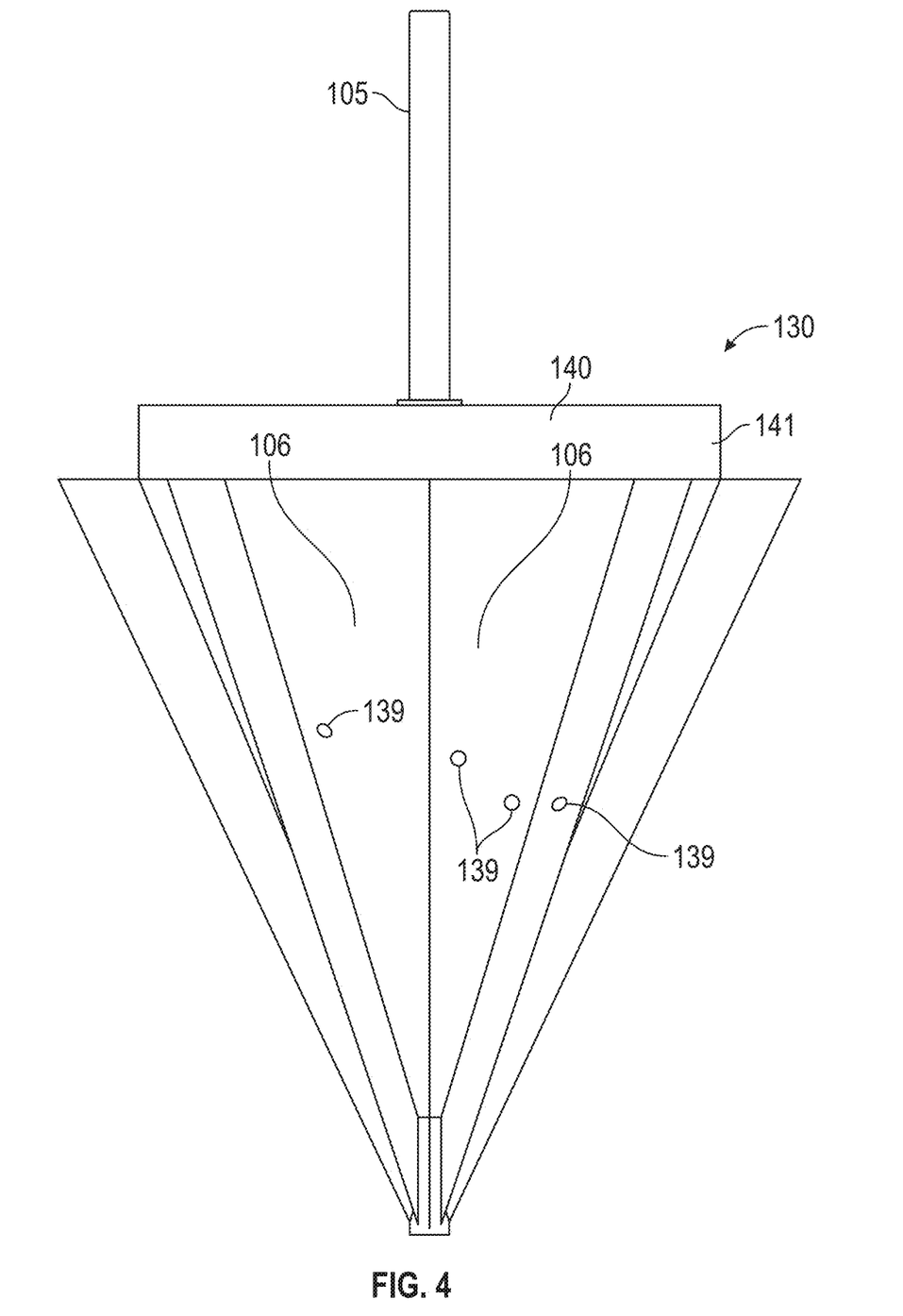
FIG. 4 shows a side view of the impeller in the embodiment shown in FIG. 2.

FIG. 4 shows another view of an illustrative embodiment in which there are veins 106 in fluid connection with ports 138 through the body of the impeller 130. The ports 138 allow the material to flow into cyclone 138 from the veins or distribution veins 106 into the cyclone 120. As can be seen, the material or fluid goes into the inlet to provide media or liquid to the spinning paddle or impeller 130.

Figure 5:
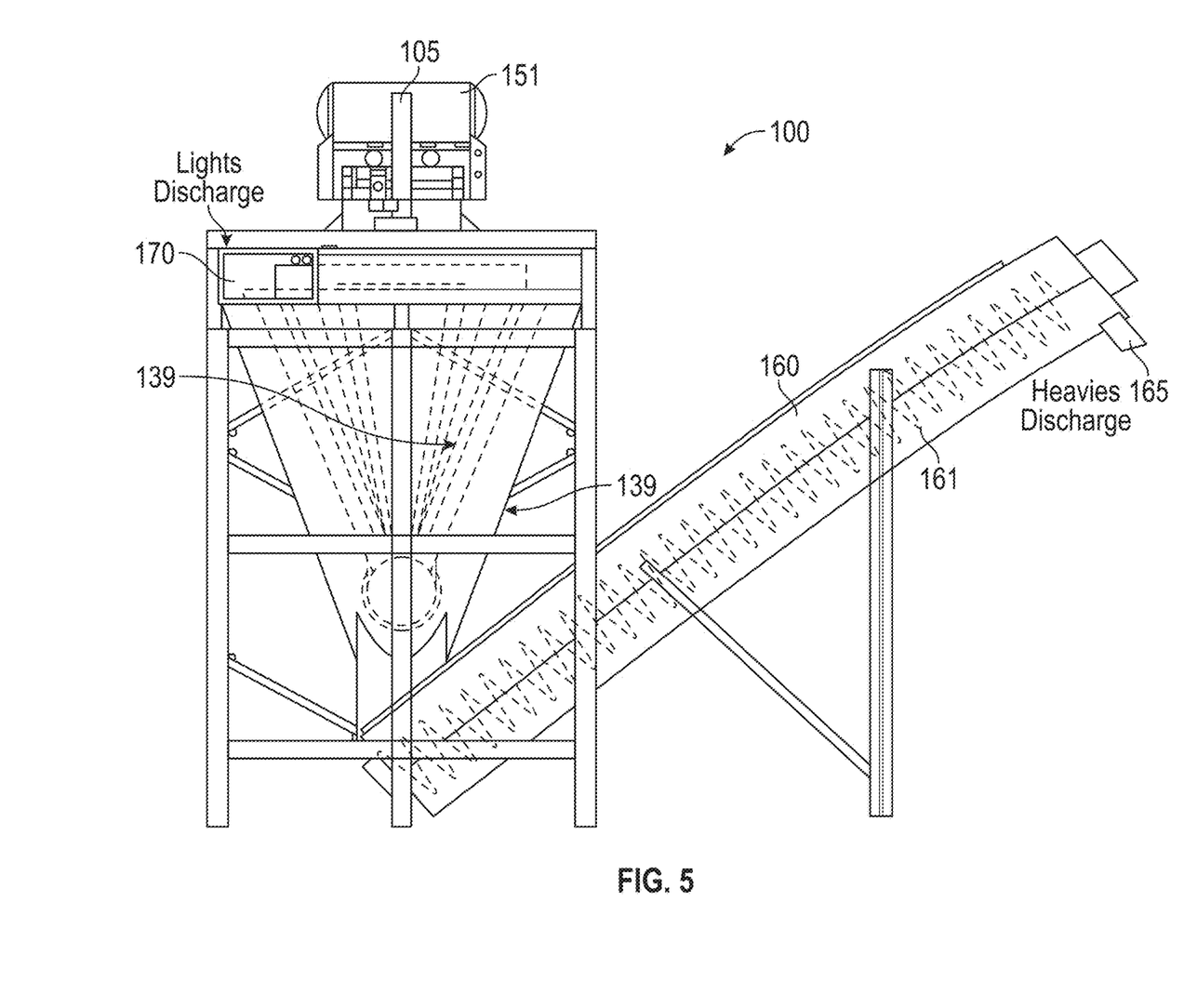
FIG. 5 shows a side view of the four-dimensional separator embodiment in a frame.
Figure 6:
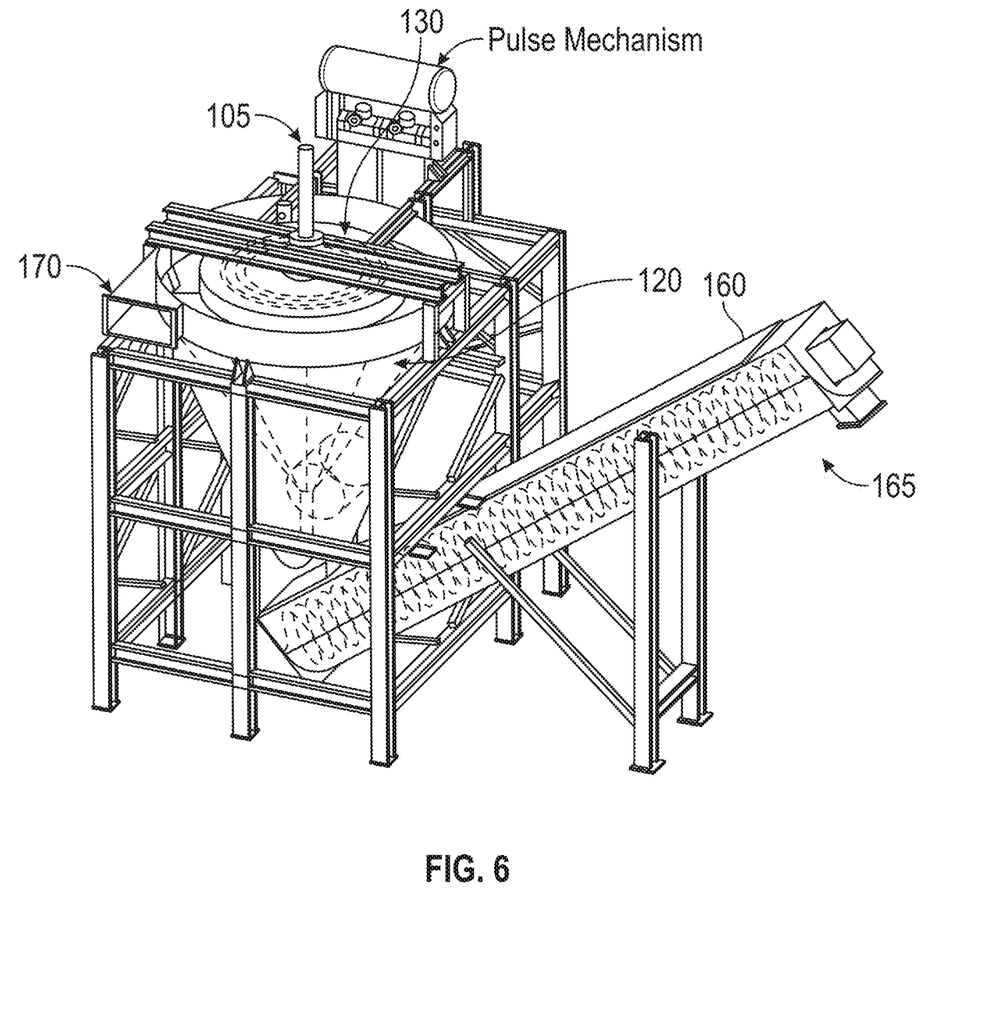
FIG. 6 shows a perspective view of the four-dimensional separator in a frame shown in FIG. 5.

FIG. 5 and FIG. 6 shows a side view and perspective view of a separator 100, which material enters the top of the cyclone 120. The media flows into the impeller 130, flows to the distribution veins 106 from the media inlet 105, through ports 139 in the impeller 130, and then to the cyclone 120. The lights are collected at a first discharge 170 and the heavies are collected through a second discharge 165, after they flow from the bottom of the cyclone 120 and through a conveyor 160. The conveyor 160 may have a rotating spiral 161. The separator 100 may have a pulsing chamber 151. The dashed lines show the features shown FIGS. 2-4.

In another embodiment, the separator can have a fixed screen that screens larger sized materials from reaching the bottom of the cone, which is provided at an angle inside the conical housing of the cyclone. Water or other media can fill the entire cyclone to a predetermined level (shown in FIG. 2). On the top of the cyclone, one or more feed distributors may be used to agitate the water or to create a centrifugal motion along with pulsing the material outward. When the water hits the rotating impeller, the energy of the impeller is transferred to the water, forcing the water outward (e.g., centrifugal force, jolt surge effect). The water is displaced outward, and more water can enter the suction side of the pump to replace the displaced water. Materials to be sorted can enter the cyclone through a feed chute/inlet located, e.g., on the top of the cyclone next or above the impeller. In one example, the impeller comprises a shaft that extends from the center-top cylindrical portion of the cyclone down towards the cone. On the bottom of the shaft, fixed paddles are provided. In operation, the impeller rotates to generate a centrifugal motion of the water. The centrifugal motion or stirring motion may be generated by the impeller or stirrer.

Another embodiment includes a method for separating and recovering materials from a waste stream, the method comprising (a) feeding the materials into a separator having media that has specific gravity between about 1.0 and 3, wherein the separator has a centrifugal/stirring motion and a vertical motion therein, (b) flowing media from the top of or through an impeller into the cyclone to generate the specific gravity, (c) collecting light materials that float on a top portion of the separator, and collecting the heavy materials through a bottom portion of the separator.

Another embodiment includes a method for separating and recovering materials from a waste stream, the method comprising: feeding the materials/media or through an impeller into a separator having media that has specific gravity between about 1.1 and 3, wherein the separator has a centrifugal motion and a vertical motion therein; flowing media into the separator to generate the specific gravity, wherein the separator has a cyclone that has a cylindrical top section and a conical bottom section; introducing the material through the inlet in an impeller that can generate the centrifugal motion, generating an upward flow of the media, wherein the upward flow of media through the inlet generates the upward flow of media and the vertical motion; generating a downward flow of the media, collecting light materials that float on a top portion of the separator; and collecting heavy materials through a bottom portion of the separator. The inlet is through the impeller and has distribution veins to distribute the waste material into the cyclone.

One embodiment includes a separator for the separation of a waste stream. The separator has a cyclone having a screen, a stirrer (e.g., an impeller), and an inlet for accepting the waste stream; a dewatering device; and a screw conveyor. The dewatering device can be a dewatering screen, dewatering conveyor, a screw conveyor or bucket elevator. The cyclone has a cylindrical and conical housing having an interior surface, and inlet and outlet. A fixed screen, around the base of the cyclone, screens larger sized and impedes materials from reaching the bottom of the cone. The cone has an angle inside the conical housing of the cyclone. Water or other media can fill the entire cyclone to a predetermined level. On the top of the cyclone, an impeller may be used to agitate the water in a centrifugal motion. When the water hits the rotating impeller, energy of the impeller is transferred to the water, forcing the water out (centrifugal force, jolt surge effect). The water is displaced outward, and more water can now enter the suction side of the pump to replace the displaced water. Materials to be sorted can enter the cyclone through a feed chute/inlet located, e.g., on the top of the cyclone next to or above the impeller. In one example, the impeller comprises a shaft that extends from the center-top cylindrical portion of the cyclone down towards the cone. On the bottom of the shaft, fixed paddles are provided. In operation, the impeller rotates to generate a centrifugal motion in the water. The centrifugal motion is generated by the impeller.

The heavier materials that sink to the top of screen are discharged through a material discharge device such as a valve, gate, rotary valve, sealed bucket conveyor or sealed screw-conveyor to allow for the heavier materials to exit the cyclone while reducing the amount of water or media that flows therethrough. The additional water or media that is required to make up for the lost water or media that abandons the cyclone through the lighter material discharge, fine heavier material discharge or the heavy material discharge zones may be added to the cyclone. The water supply should be the correct volume and pressure—too low of flow and pressure may result in poor separation and too high of flow and pressure may cause instability in the cyclone.

The separated products produced in the four-dimensional separation apparatus or system may be designated as follows: (1) the "lights", which are discharge through an exit passage located on the top of the cyclone; (2) the "heavies", which consists of particles that have a specific gravity large enough that they sink to the bottom of the cone/cyclone. As is known, the terms "heavier" and "lighter" refer to relatively greater and lesser specific gravity, respectively, and the weight is less important than buoyancy. The system or separator can also discharge unwanted solids with the heavies fraction.

In an alternate embodiment, the axial or tangential pipe or chamber may generate a constant inflow of water or media rather than constant pulsating streams of media. Such continuous up flow of water will still generate the fourth-dimension of separation to enhance the efficiency of the separation and may be used when processing different materials. For example, the pulsating upward and downward motion may be used when processing prone to entanglement recyclables such as recyclables containing insulated or bare wire. The inflow and outflow of water or other media will reduce the chances for light recyclables from ending on the heavy fraction.

In another embodiment, the media or fluid used in the recovery system may be any liquid capable of washing the materials and causing the metal to suspend into the process fluid. In other embodiments, the recovery system may use chemicals which can extract and suspend the desired constitute. Examples of such solutions are well known to those of skill in the art. One example of such a solution is water. In other embodiments, chemicals, minerals and or any magnetic material that can be used to change the specific gravity of the fluid to obtain an actual constant specific gravity range of 1.0 to 3.0 SG depending on the application. The 1.0 specific gravity separation chamber, because there is no added suspension media component it, that is, the liquid is water. Another alternative for attaining specific gravities of greater than 1.0 specific gravity media is through the use of magnetite or ferrosilicon, sand and mixtures thereof. In one example, the sand has a size less than 200 mesh, which may be a byproduct of aggregate production, can be used. A specific gravity of about 1.6 can be used to separate organic and inorganic materials, about 3 can be used to separate heavy metals, and about 1.8 to 2.0 can be used to separate aluminum/magnesium.

In another embodiment, in some cases the media includes inorganic dirt, sand, glass fines, ferrous fines, ash (e.g., incinerator bottom ash, automobile shredder residue (ASR)), or fines, and combinations thereof, which can be screened with a screen having 16 mesh or less to create a suspension or media having a specific gravity of 1.5 or 1.6 SG or higher. In certain examples, the particles had a size less than 325 mesh (44 microns). In other examples, the particles had a size greater than 200 mesh (74 microns). In such cases, the apparatus or system or separator can use inorganic media fines that can come from automobile shredder residue fines, shredder fines from Hammermill operations, ferrous slag or inorganic fine byproducts from incineration and/or pyrolysis operations. Further, other minerals that may be mixed in a landfill containing metals can be used. In one example, fines from a bail mill process (of e.g., ash) having 200 mesh or greater can be used to generate media, which can be used as media to obtain media up to 3 SG.

By using media with a specific gravity of 1.6 SG or higher, the costs to an operator can be reduced or nullified, that is, the costs to the operator may be net zero. Media with a specific gravity of 1.6 SG or higher can be used to separate organics and inorganics. A main difference between organics and inorganics is the fact organics contain carbon and that organics can then be used to produce a BTU feedstock for incineration, pyrolysis, or other separation to produce salable plastics, rubber, foam etc.

The material fed into the separator may be size reduced and classified through techniques for converting streams into fragments and particulates. For example, a shear shredder or screening may also be used to shred or size reduce the solid wastes and waste streams, to cause size reduction, fragmentation and particulate formation. In one example, the material is sized from about 0-12 mm, which in the case of ASR and electronic scrap, the majority of recovered material will include inorganics, glass, rock, any other minerals. The material can also be sized from about 12 to about 100 mm, and greater than 100 mm. The solid wastes and waste stream materials can be size fragmentized into, discrete sizes. In some examples, the feed size is not the same as the screen size, which can lead to improved performance.

The simultaneous centrifugal, downward, outward, and vertical motions of the four-dimensional separator enhance the separation efficiency of the materials by processing high throughputs and reducing the limitations of typical recyclable materials such as moisture content. The four-dimensional separator may provide a cost-effective method of concentrating recyclable materials into discrete specific gravities doing so at higher throughputs than typical sorting technologies. Such discrete specific densities are determined by the centrifugal speed of the water or media generated by the impeller as well as by the inflow and outflow of water through the bottom pipe or pulse chamber. More narrowly sized fragments can provide for the better separation.

In another embodiment, there can be multiple separation systems that use two or more separators to separate materials in a mixture. The multistage systems can include multiple cyclone separators. By use of the present invention, reject materials can be maintained at a relatively low level such that the plant can be operated at maximum capacity on a continuous basis.

In one example, the stratification from the vertical motion or up/down motion can be generated through an axial connection provided underneath the screen in the conical section of the cyclone. Such connection allows for water or other media to enter to the cyclone. Such water or media that enters through the axial connection generates an upward and downward motion, therefore the fourth-dimension of the separation apparatus. The axial connection may also be tangential and in the form of a pipe or chamber. One example of the stratification apparatus can be an air-over-water pulsating chamber or water pulsation generated in an air chamber. In such an example, air inside a chamber expands and contracts to create an upward and downward flow of water into the cyclone through the axial or tangential connection.

The centrifugal motion allows for materials to spin or stir inside the cyclone. The resulting centrifugal action causes heavier particles to be thrown towards the outer wall of the cyclone (or have a higher residence time), and they are then allowed to slide down the cylindrical and conical walls towards the screen. The finer heavier recyclables that sink to the bottom are discharged at the bottom of the cone with the use of a discharge device such as a valve, movable gate, rotary valve, screw conveyor, drag conveyor prevent the continuous discharge of water but allows the finer heavier recyclables to exit when the device is energized. The lighter materials that stay in suspension on the top of the cyclone are eventually discharged continuously by the carrying circular current through a tangential passage located on the high side of the cylinder.

The rotational speed of the impeller as well as the frequency and stroke of the stratification apparatus of the cyclone may be varied to optimize the separation process. Without intending to be bound to specific theory, these two effects are combined into a single separation unit in which several principles come into play such as the Archimedes Principle, which explains how the apparent weight of an object immersed in water decreases. Other principles applied due to the four-dimensional separation includes the Hindered Settling effect, the Consolidation Trickling effect, as well as the Jerk Effect also referred to as Jolt Surge effect that is caused by both the centrifugal motion created by the impeller and the upward/downward movement of the stratification component.

The upward, outward, and/or downward motion of the media enhances the separation by reducing the amount of lighter materials that are misplaced or entangled with heavier materials that sink to the bottom of the four-dimensional separator. Such upward, outward and downward motion, referred to as the fourth separation dimension, can be provided through the axial or tangential pipe or chamber in the form of pulses that generate upwards and downward currents of other media, pulse chamber. Such inflow and outflow of water to the cyclone generates a rising current of water that improves the separation efficiency and downward flow of water allows for the heavier particles to stratify on top of the screen provided inside the cone. The downward motion change to upward motion causes acceleration that increases the downward force (e.g., similar to gravity). Simple harmonic motion of the type can increase the acceleration by about 50% to about 100% of normal gravitational acceleration. The shear and suspension of the material also helps separate the material.

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

The invention claimed is:

1. A separator for separating and recovering materials from a waste stream, the separator comprising:
   a source of the waste stream;
   a cyclone having an impeller, a feed chute, and a media inlet for accepting media, wherein the cyclone has a cylindrical top section and a bottom section, the media inlet is through the impeller, and the waste stream enters the cyclone through the feed chute, the impeller rotates in a first direction about an axis in the cyclone, and the media inlet is in fluid connection to distribution veins within the impeller;
   a source of media having a specific gravity between about 1.0 and 3.0, wherein the media enters the impeller through the media inlet as a flow of media or a pulsating flow of the media, and the source of media is in fluid connection to the cyclone through the media inlet generating an upward flow within the cyclone;
   a first discharge passage for a collecting a light fraction; and a second discharge passage for collecting a heavy fraction.

2. A separator for separating and recovering materials from a waste stream, the separator comprising a source of the waste stream; a cyclone having an impeller, a feed chute, and a media inlet for accepting media, wherein the cyclone has a cylindrical top section and a bottom section, the media inlet is through the impeller, and the waste stream enters the cyclone through feed chute, the impeller rotates in a first direction about an axis in the cyclone, wherein the media inlet is coupled to the impeller by a rotary coupling such that the impeller may rotate independent of the media inlet, a source of media having a specific gravity between about 1.0 and 3.0, the media enters the impeller through the media inlet as a flow of media or a pulsating flow of the media, and the source of media is in fluid connection to the cyclone through the media inlet generating an upward flow within the cyclone; and a first discharge passage for a collecting a light fraction; and a second discharge passage for collecting a heavy fraction.

3. The separator of claim 1, wherein the impeller has outlet ports in fluid connection with the distribution veins, wherein the media flows out of the outlet ports.

4. A separator for separating and recovering materials from a waste stream, the separator comprising: a cyclone having a top section and a bottom section, an impeller have a top section and bottom section and positioned within the cyclone, a media inlet for accepting a flow of media or a pulsating flow of the media operatively connected to the impeller, wherein media or fluid flows through the impeller into the separator; a first discharge passage for a collecting a light fraction, a second discharge passage for collecting a heavy fraction; and the media inlet is in fluid connection to distribution veins within the impeller.

5. The separator of claim 1, wherein the media inlet is connected to the impeller through a rotary coupling.

6. The separator of claim 5, wherein the second passage is above the third passage.

7. The separator of claim 1, wherein the media has dirt, sand, glass fines, ferrous fines and combinations thereof.

8. The separator of claim 1, wherein the media has a specific gravity of about 1.6 SG or higher.

9. The separator of claim 1, further comprising an air-over-water chamber and the media is pulsed with the air-over-water chamber.

* * * * *